Nov. 27, 1934.  C. H. NORDELL  1,982,266
SYSTEM FOR HANDLING SEWAGE
Filed Jan. 3, 1933  3 Sheets-Sheet 1

INVENTOR.
CARL H. NORDELL
BY
ATTORNEY.

Nov. 27, 1934.　　　　　C. H. NORDELL　　　　1,982,266
SYSTEM FOR HANDLING SEWAGE
Filed Jan. 3, 1933　　　3 Sheets-Sheet 2

INVENTOR.
CARL H. NORDELL
BY
ATTORNEY.

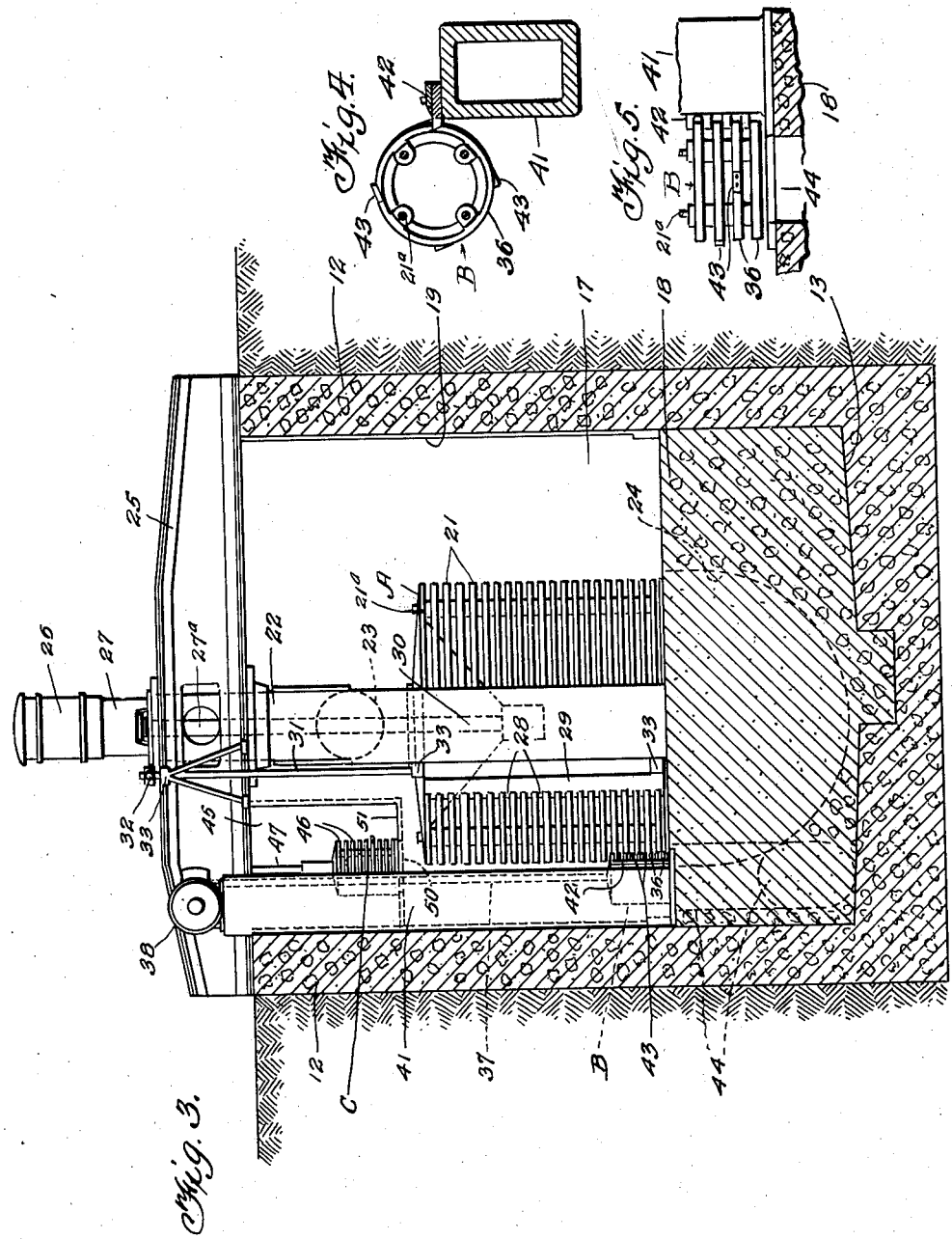

Patented Nov. 27, 1934

1,982,266

UNITED STATES PATENT OFFICE 1,982,266

SYSTEM FOR HANDLING SEWAGE

Carl H. Nordell, Chicago, Ill.

Application January 3, 1933, Serial No. 649,798

11 Claims. (Cl. 210—152)

This invention relates to systems for handling sewage or trade wastes and its principal object is to provide a system of screens and comminuters whereby great volumes of sewage may be strained and the solid particles comminuted or reduced to a small enough size to pass through screens along with the flow of the liquids therethrough.

Another object is economy in operation, and an arrangement of screening units which requires only a minimum amount of power to operate them.

With these and other objects and advantages in view, this invention consists in a system for handling sewage in which is comprised one or more large screens through which the greater portion of the sewage is strained, and one or more comminuters associated therewith and serving to reduce the solids, which are intercepted by the large screen, into size small enough to pass through screens and flow on with the liquid that is strained by the larger screen. The invention further consists in a system for handling sewage in which the greater part of the strained liquid is sent on for suitable disposal and that part which requires further treatment is sent on through a different channel or duct to a suitable disposal plant.

The invention further consists in the several novel features hereinafter fully set forth and claimed.

The invention is clearly illustrated in the drawings accompanying this invention in which:

Fig. 3 is a vertical cross section taken on the line 3—3 of Fig. 1;

Fig. 4 is a detail horizontal section of one of the comminuters taken on the line 4—4 of Fig. 2;

Fig. 5 is a detail fragmental side elevation of the comminuter seen in Fig. 4; and Fig. 6 is a vertical longitudinal section illustrating a slightly modified form of the invention.

Figure 1:
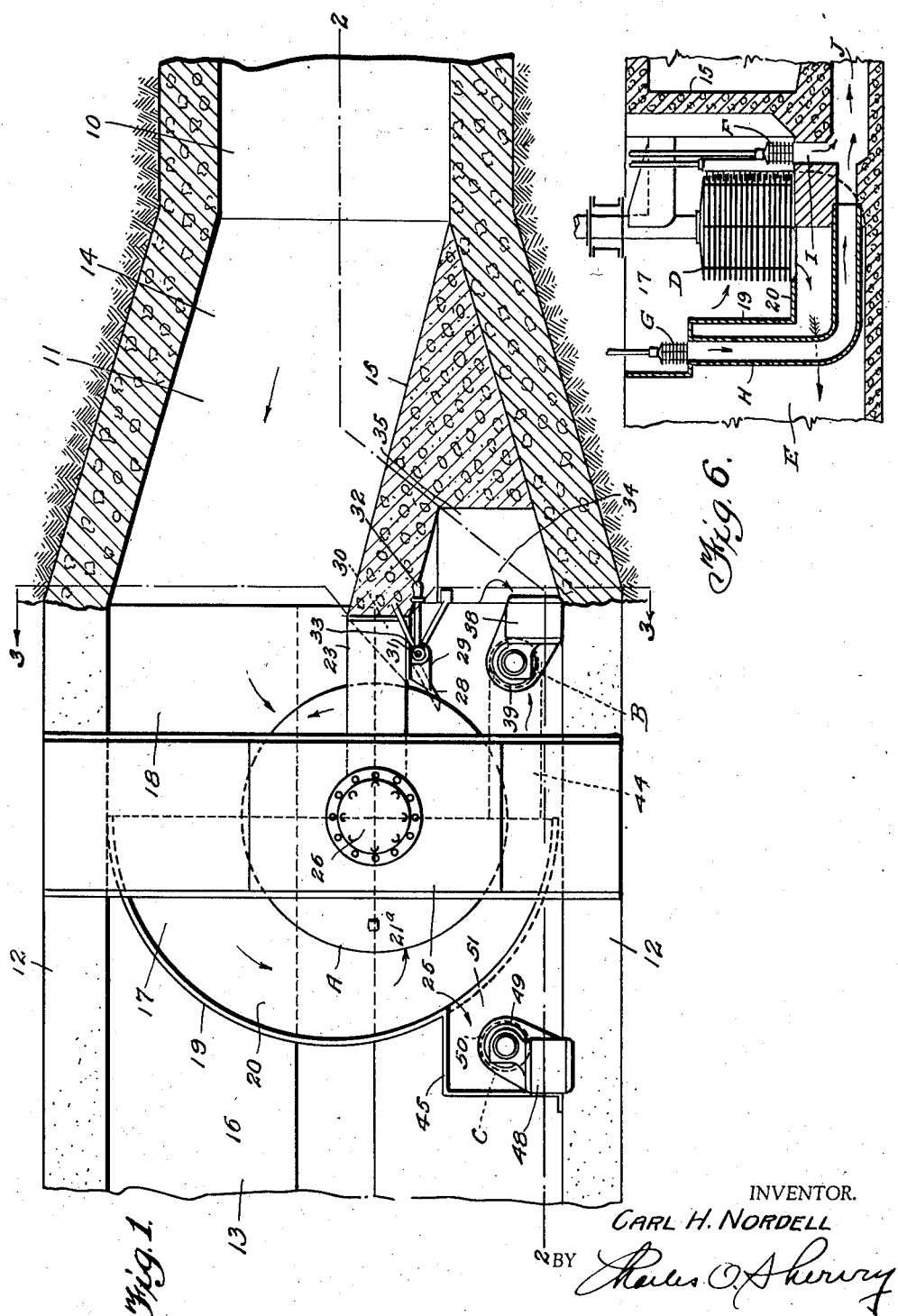
Fig. 1 is a view partly in plan and partly in horizontal section of a structure illustrating a simple embodiment of the system forming the subject matter of the present specification.
Figure 2:
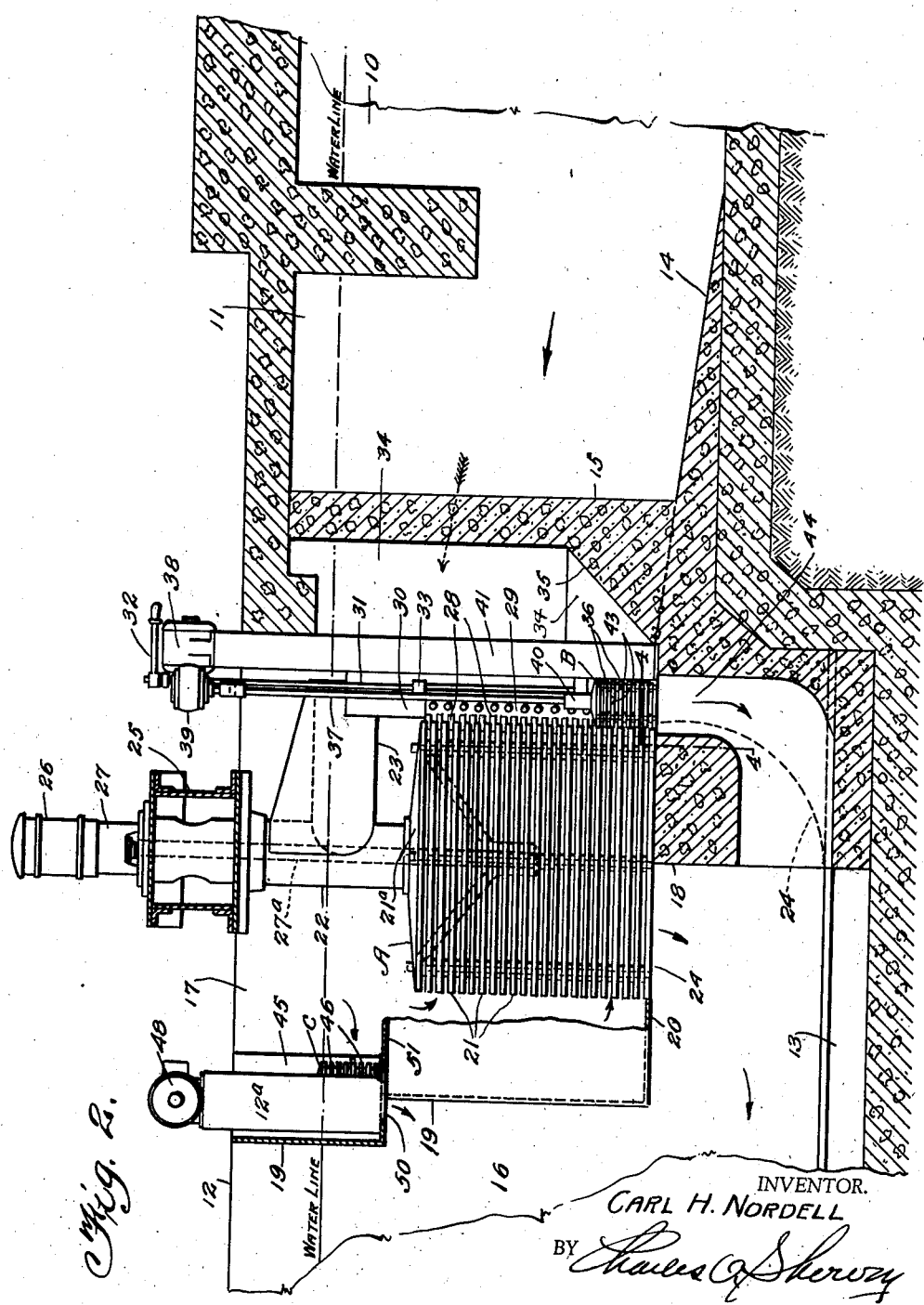
Fig. 2 is a vertical longitudinal section taken on the broken line 2—2 of Fig. 1.

Referring to said drawings, and first to Figs. 1 to 5 inclusive, the reference character 10 designates the approach tunnel or conduit, through which raw sewage or sewage after passing through coarse screens, passes through a neck 11 to and through a screen chamber 17, and thence to the grit chamber proper 16 which conveniently may comprise side walls 12, and a trough-like bottom 13. From the grit chamber the strained sewage or trade waste flows on to another plant for subsequent treatment. A ramp or inclined bottom 14 leads to the screen chamber and an obliquely disposed side wall 15 is provided which forms a neck or passage 11 of such capacity as to maintain a sufficient velocity through this passage to prevent material from settling therein.

The passage 11 empties into the screen chamber 17 which is formed by a masonry base 18, built up in the grit chamber 16, a curved end wall 19, desirably in the form of a metal wall, and a bottom 20 also desirably formed of metal. The end wall 19 is preferably semi-circular and extends from one side wall 12 to the other. An opening 24 in the bottom wall 20 connects the screen chamber 17 with the bottom portion of the grit chamber or channel 16.

A screen or strainer A of great capacity is contained in the screen chamber, and intercepts larger solids, but permits the liquids and smaller solids and semi-solids to pass through the opening 24 to the grit chamber or discharge conduit or duct 16. Desirably the screen A, is composed of spaced rings 21 suitably secured together by bolts or otherwise and having a closed top 21$^a$. The screen is suspended or mounted over the opening 24 and as shown is suspended from a bracket comprising a column 22 and a side arm 23. The column 22 and screen are supported by a bridge structure 25 of structural design, and a motor 26 is mounted on the bridge to rotate the screen through speed reduction gearing contained in a gear casing 27 disposed under the motor and driving a shaft 27$^a$ connected to the screen.

The screen rotates about a vertical axis, and water and waste entering through the slots between the rings pass downwardly through the screen and discharge through the opening 24 into the grit chamber 16 from which it flows on for further treatment.

For the purpose of keeping the slots of the screen free from accumulated matter a comb or toothed scraper is provided which has teeth 28, supported in a supporting head 29 which is swingably mounted upon a column 30 located at the end of the wall 15. A rock shaft 31 connected to the head 29 and supported in bearings 33 extends up into convenient position for manipulation and has a hand lever 32 on its upper end by which the shaft and therewith the scraper head 29 may be turned. With this arrangement the teeth of the comb or toothed scraper may be disengaged from the slots between the rings of the screen, when the screen is being started or to clean the comb.

Particles which will not pass through the slots between the rings of the screen, are carried around by the rings, due to the contact established by lighter liquids flowing to and through the screen and when they reach the teeth 28 of the comb or scraper, these solids are dislodged from the screen, and collect in a chamber 34 located directly beyond the comb as is seen in Fig. 1. The chamber 34 is provided with an inclined bottom 35 to direct the accumulating heavy solids to a comminuter B, located in the screen chamber 17 adjacent the lower end of the inclined bottom of the chamber 34, and by which the heavy solids are reduced sufficiently in size to pass through the comminuter and join the flow from the main screen A.

Desirably the comminuter comprises a plurality of spaced rings 36 suitably secured together, to form a drum-like structure, supported and rotated by a vertical shaft 37 connected to and driven by an electric motor 38 through reduction gearing 39. A bearing 40, mounted on a column 41, steadies the lower end of the shaft 37 and said column carries the motor 38 at its upper end. A comb or toothed scraper 42 secured to the column 41 with its teeth entering the slots between the rings 36 provides means for keeping the slots free from accumulating matter.

The comminuting elements may comprise cutters or choppers 43 disposed on the peripheries of the rings 36, and co-operating with the comb or toothed scraper 42 to break up the solids. The slots in the comb between the teeth thereof are of sufficient depth to permit the cutters or choppers 43 to pass through. The cutters or choppers may take any desired form and the one ilustrated in Fig. 4 serves for the purposes of illustration. The cutters or choppers co-operate with the comb 42 to cut and tear the solids into small enough particles to pass through the slots between the rings 36 along with the flowing liquids.

The comminuter B is placed over the upper end of a duct 44 that leads through the masonry to the lower end of the grit chamber or channel 16, and discharges the mass, that passes through the comminuter B, into the grit chamber, whereby it commingles with the strained liquids which are discharged thereinto by the screen A, and passes on for further treatment.

The comminuter B handles the heavier solids that sink to the bottom of the screen chamber. Lighter solids are contained in the sewage or other trade waste treated, which solids float at or near the top of the stream. In order to reduce the lighter solids into sufficiently small fragments that can be handled in the treatment of the sewage, a second comminuter C, is provided which as shown is located just below the level of the incoming liquid. The comminuter C is mounted in a recess 45 formed by a continuation of the side wall 19 of the screen chamber 17, the bottom 51 of which recess is raised above the bottom 20 and runs to the side wall 12. The comminuter C may comprise substantially the same construction as the comminuter B, and likewise has spaced connected rings 46 provided with cutters or choppers co-operating with a comb or toothed scraper for comminuting the solids. The comminuter C' is located over an opening 50 in the bottom 51 and discharges the comminuted material and liquid into the grit chamber permitting it to commingle with the strained liquids discharged by the screen A and comminuter B. The comminuter C is supported and rotated by a shaft 47 driven by a motor 48 through speed reduction gearing 49. The motor 48 is mounted on a projecting part 12ª of the wall 12.

In the operation of the system described practically all of the liquids are strained through the screen A, and pass on to the grit chamber or channel 16. Heavy solids that are intercepted by the screen are attacked by the comminuter B, and reduced to a small enough size to pass through the screen portion of the comminuter and discharge with the flow of liquid into the grit chamber. The lighter solids are attacked by the comminuter C and by it reduced to a small enough size to pass through the screen portion thereof along with the flow of liquid to the grit chamber.

From the above it will be apparent that a large screen or strainer may be employed for handling the bulk of the sewage or trade waste, and that the screen is continuously kept clear so that the liquids may freely pass therethrough. Inasmuch as the large screen does not have to break up the solid matter, only sufficient power is required to rotate the screen against the scraping action of the comb or scraper, and inasmuch as the comminuters are made relatively small as compared with the size of the main screen, no great amount of power is required to drive them, consequently the mass can be handled economically and without danger of injury to the several parts.

In the modified form illustrated in Fig. 6, the main screen D, comminuters F and G are constructed and disposed in the same relation as are the corresponding parts in the preferred form. Instead of discharging the comminuted particles and liquids into the same channel E, as the main screen D discharges the strained liquids, the comminuters F, G discharge through separate ducts I, H into a separate channel J which leads off to some other place, than the channel E. This form of the invention is particularly desirable in connection with sewers when handling storm waters, as when there is an abnormal amount of water to be handled. The liquids passing through the main or large screen D are screened or strained and are conducted through a grit or settling chamber E to a suitable place for treatment or otherwise, and the solids are comminuted by the comminuters F, G and the mass conveyed (along with the liquids passing through them) to a separate place for subsequent treatment.

While the invention has been shown and described in connection with sewage disposal, it is to be understood that, the apparatus and method described can be used in connection with the handling of other liquids containing solids and semi-solid material.

I claim as new and desire to secure as Letters Patent:

1. In a system for handling sewage, the combination of main straining means, and a separate submerged comminuter for comminuting solids intercepted by the straining means without removing the solids from the sewage, said comminuter discharging the comminuted material beneath the surface of the sewage.

2. In a system for handling liquid containing solids, the combination of main straining means, a separate submerged comminuter means for comminuting solids intercepted by the straining means, and means beneath the surface of the liquid for discharging the strained liquid and comminuted mass into a common place, without removing the comminuted material from the liquid.

3. In a system for handling liquid containing solids, the combination of main straining means, a separate submerged comminuter for comminuting solids intercepted by the straining means, and means beneath the surface of the liquid for separately discharging the strained liquid and comminuted mass beneath the surface of the liquid into separate non-communicating channels.

4. In a system for handling liquid containing solids, the combination of a chamber, main straining means therein, separate submerged comminuting means located adjacent the surface of the liquids in the chamber for comminuting light solids intercepted by the main straining means, and other comminuting means submerged in the liquid adjacent the bottom of the chamber for comminuting heavy intercepted solids.

5. In a system for handling sewage, the combination of a chamber, main straining means therein, separate submerged comminuting means located adjacent the surface of the sewage in the chamber for comminuting light solids intercepted by the main straining means, other comminuting means submerged in the sewage and located adjacent the bottom of the chamber for comminuting heavy intercepted solids, and means for discharging the strained liquids and comminuted mass into a common place.

6. In a system for handling sewage the combination of a self-cleaning main screen and a separate submerged comminuter having a self-cleaning screen, both discharging beneath the surface of the sewage.

7. In a system for handling liquid containing solids the combination of a self-cleaning main screen, a separate submerged comminuter having a self-cleaning screen, and a duct beneath the surface of the liquid for conveying the comminuted mass and discharging the same beneath the surface into the liquid strained by the main screen.

8. In a system for handling sewage, the combination of a motor driven, self-cleaning rotary screen, and a separate, motor driven, submerged rotary comminuter having a self-cleaning screen for discharging the comminuted mass beneath the surface into the strained liquid.

9. In a system for handling sewage, the combination of a motor driven self-cleaning rotary screen, a separate motor driven submerged rotary comminuter, having a self-cleaning screen, a conduit for conveying away the liquid strained by the main screen, and a conduit beneath the surface of the sewage for discharging the mass comminuted by the comminuter, under the surface of and into the liquid strained by the main screen.

10. In a system for handling sewage, the combination of a chamber into which the sewage is delivered and from which it discharges, rotary straining means through which the major portion of the liquids are strained, and a submerged comminuter having a rotary screen to which solids pass that are intercepted by the main screen, said comminuter serving to reduce solids beneath the surface of the sewage to smaller size capable of passing through the screen, and discharging the comminuted material beneath the surface.

11. The process of handling sewage containing solids which consists in straining the sewage and, without removing the solids from the remainder of the sewage, separately comminuting intercepted solids under the surface of the sewage and passing the comminuted material through a strainer beneath the surface of the sewage.

CARL H. NORDELL.